United States Patent [19]

Williams

[11] Patent Number: 4,484,844

[45] Date of Patent: Nov. 27, 1984

[54] HORIZONTAL DRILL PRESS

[75] Inventor: Floyd G. Williams, Naturita, Colo.

[73] Assignee: Kybato, Inc., Naturita, Colo.

[21] Appl. No.: 383,539

[22] Filed: Jun. 1, 1982

[51] Int. Cl.$^3$ .............................................. B23B 49/00

[52] U.S. Cl. ........................................ 408/82; 408/88; 408/100; 408/712

[58] Field of Search .................. 408/712, 100, 88, 82, 408/237, 75, 99, 79, 80

[56] References Cited

U.S. PATENT DOCUMENTS

| | | | |
|---|---|---|---|
| 1,432,027 | 10/1922 | Leonard et al. | 408/100 |
| 1,674,669 | 6/1928 | Stedman | 408/237 X |
| 2,468,358 | 4/1949 | Clark | 408/712 X |
| 2,627,295 | 2/1953 | Jackson | 408/712 X |
| 2,737,065 | 3/1956 | Piersall | 408/712 X |
| 2,909,083 | 10/1959 | Chestnut | 408/237 X |
| 2,925,001 | 2/1960 | Johnson | 408/712 X |
| 3,007,686 | 11/1961 | Pearson | 408/80 X |
| 3,234,977 | 2/1966 | Byers | 408/712 X |
| 3,674,375 | 7/1974 | Reed et al. | 408/75 X |
| 4,010,943 | 3/1977 | Est | 408/712 X |

*Primary Examiner*—William R. Briggs
*Assistant Examiner*—Glenn L. Webb
*Attorney, Agent, or Firm*—James E. Pittenger

[57] ABSTRACT

A portable horizontal drill press for drilling holes in the surfaces of highway vehicles and construction type equipment including a T-shaped base support beam which is mounted on swivel type wheels with low clearance provided to minimize tipping. A drill support column having a slidable mounting platform for an industrial type drill motor is mounted at one end of the beam support structure. The drill motor platform includes a hand wheel and lead screw combination which is used for feeding the drill motor into the work. The height of the drill motor platform can be adjusted either by a rack and pinion gear provided on a one-piece solid column or the column can be provided in several telescoping sections which can also combine a rack and pinion gear for the upper section of the column. A similar height elevating and positioning arrangement can be provided for a center support column provided at the opposite end of the base support beam. The center support column can be longitudinally moved with respect to the drill platform along the elongated support beam for adjusting the position of the drill center column in relation to the drill motor. A drill center rod is provided on the center support column and adjusted to contact that opposite side of the object so as to back-up the drill during the drilling process. In one embodiment the drill support column has a pivoting socket arrangement whereby the column can be laid down parallel to the support beam to allow the center column to be moved under an object having low clearance and then erected for positioning the drill center opposite the location of the area to be drilled.

11 Claims, 8 Drawing Figures

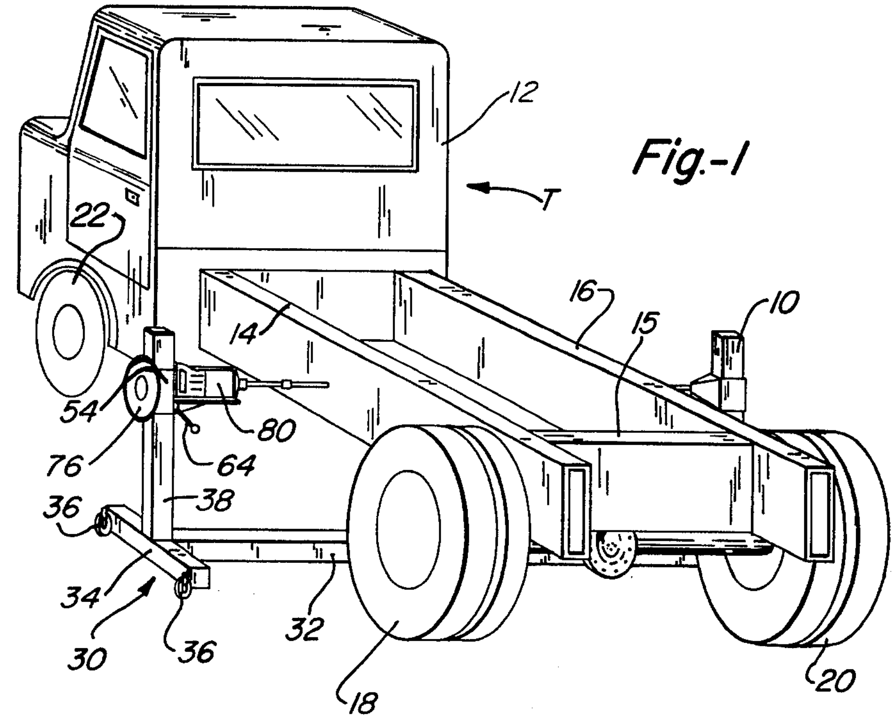
Fig.-1
Fig.-2
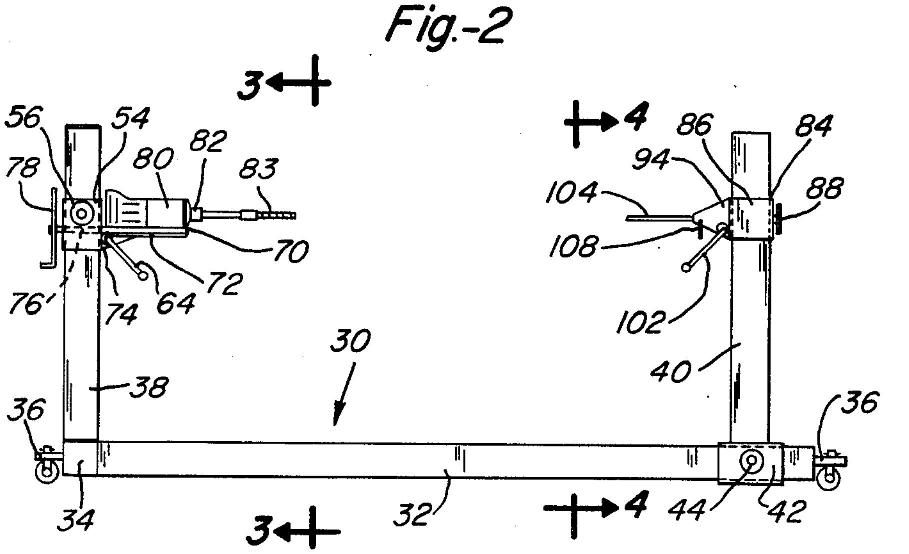

HORIZONTAL DRILL PRESS

FIELD OF THE INVENTION

This invention relates to a machine for drilling or boring holes in a generally horizontal direction. It is more specifically directed to a portable drill press which is height adjustable and which is mounted on a long span support beam which includes a drill center which is both distance and height adjustable to accommodate the width of vehicles or other large objects.

BACKGROUND OF THE INVENTION

In the past there has been a considerable need for a drilling machine which provides the capability of drilling accurately positioned and straight large diameter holes in a horizontal direction in vehicle chassis frames and other objects. This has been especially true in construction-type vehicles or equipment which has a number of pivoting or articulated joints which need to be repaired or replaced at various times. In order to be able to drill, tap or ream these holes it is necessary to provide a stable platform for the electric or air driven drill motor so that the desired accurate results can be obtained.

In the drilling of large diameter holes common in industrial or construction-type applications, the large size drill motor which is required is too heavy and cumbersome to be handled manually and supported by one or two operators during the drilling process. Because of this it is mandatory that a drill motor of this size be suitably supported by an auxiliary device for holding the drill motor during the drilling operation. One of the devices which has been provided in the past is a magnetic support or base upon which the drill motor is mounted. This mount assembly includes a rack and pinion feed arrangement for moving the drill in relation to the surface which is being bored.

The magnetic base support is usually of the electromagnetic type so that the base and drill can be properly positioned before the magnets are energized to lock the base in position. When the drilling operation is complete, the removal of the electric current from the electromagnet releases the base allowing the drill to be repositioned or moved. In the past there have been some problems with the holding strength of the electromagnet in a device of this nature because of size and weight limitations. Usually a safety chain is attached to some structure above the device so that if the drill should come loose it will not fall and injure the operator.

Another of the problems with a magnetic drill support of this type is its inability to securely attach to a surface which has some irregularities, corrosion or curvature. Another critical limitation is the inability of the base to attach to a nonferrous material such as plastic, aluminum or copper. Thus, when drilling through these types of materials it is impossible to utilize this type of support.

Another type of drill support which has been utilized in the past is a clamp base. With this type of drill base, a clamp such as a "C" type having an extended screw or lever is positioned to grip the flange or beam upon which the drilling is to be accomplished. After positioning the drill base in the proper location the lead screw or lever is tightened to clamp the base in this position. Again, similar to the magnetic type base, it is time consuming to hand support and maneuver the drill base into proper position and tighten the clamp and then reverse the process after the drilling operation has been completed.

Where it is necessary to line bore loader bucket arms or dump bed hinges it has been found that because of the distance between the hinge points which can be as much as three to five feet it is extremely difficult to accurately drill and ream these apertures by hand. For this reason, in many cases the eye or hinge points have to be cut off of the vehicle or equipment and line bored on a separate lathe or vertical mill. Even after this process has been completed it is difficult to reweld these parts to the vehicle and again provide the necessary alignment. This repair process is naturally very expensive and is accomplished with even a greater cost when considering the down time for the equipment itself during this process.

The present invention is intended to eliminate many of the problems which have been described herein. It has been found that any time it is necessary to drill a number of precisely positioned or aligned holes in a vehicle or object which is relatively close to the ground, it is desirable to be able to support the drill from the floor or adjacent support surface. By making the drill mobile and supported on this surface, it is easy to shift the drill and perform a number of drilling operations in a short time. In addition, it is easy for a single operator to manage the drilling operation without fatigue since the weight of the drill is supported for him. Thus, the heavy lifting and maneuvering of the drill motor during a number of drilling operations can be completely eliminated with the applicant's invention.

The portable or mobile horizontal drill press described herein is ideally suited for drilling a number of precisely positioned holes in the side of a truck chassis for installation of a quick change coupling arrangement. The quick change coupling kit is the subject of my copending patent application, Ser. No. 344,833, which describes a new and novel arrangement for securely attaching a truck body or other equipment to the chassis of a truck vehicle. To accomplish the installation of this coupling kit, it is necessary to precisely drill a number of large diameter holes in the vertical side surface of the chassis beams. To perform this installation a portable horizontal drill having a long reach and span is extremely useful. By the same token this same portable drill can be used for drilling or boring apertures in all types of large equipment, vehicles or accessories such as axle housings, battery boxes and fuel tanks.

SUMMARY OF THE INVENTION

This invention is directed to a long span, horizontal drill press which is portably mounted for easy movement on a support surface. The support frame or bed of the drill press is described as an elongated beam which can be of the box, I-beam or the like, type configuration. It has been found that sufficient strength is provided by the box beam with a general improvement in the appearance of the overall device. The base frame is comprised of the elongated base support beam with a short cross piece permanently attached at one end. The length of the base beam can be as great as ten or even fifteen feet depending upon the type of equipment which is anticipated. The length of the cross beam is intended to provide stability for the elongated base to keep the device from tipping. Swivel type casters or "crazy wheels" are attached to each end of the base support beams. The positioning of the wheels is arranged so that the base beams are held only a small distance above the floor or support surface to maintain a low center of gravity and stability of the device during use.

At the juncture where the cross beam is attached to the elongated support beam a vertical column is permanently mounted. This column can be formed by positioning two rectangular box beams in spaced relation so that the space or slot between the beam is arranged parallel to the elongated support beam. A plate can be welded across the top of the two rectangular beams to form a unified column support. A slidable collar is included and sized to fit the outside of the vertical column. This collar is provided with a cantilevered mounting platform for the drill motor. The face of the vertical column towards the elongated beam includes a rack gear which mates with a pinion gear assembly rotably mounted on the support collar. The pinion gear is mounted on a shaft so that by rotating a crank attached to the shaft the vertical position of the collar can be easily adjusted. Thus, with the column being four or six feet in length, the height of the collar can be easily adjusted from approximately one foot above the floor to the top of the column. A set screw or threaded lock device can be provided for locking the collar in proper position once the desired height has been established. The cantilevered platform extends outwardly from the collar in the direction of the elongated beam. A plate upon which the drill motor is releasably mounted is slidably arranged on the platform. An elongated screw having an acme thread can be provided which extends through the slot in the vertical column with a hand wheel provided on the opposite side. Thus, by rotating the hand wheel the mounting plate and drill motor can be moved horizontally and parallel to the axis of the elongated support beam to feed the drill bit into the work.

A drill center vertical support column or tailstock is provided for longitudinal movement along the horizontal support beam. A drill center slidably mounted on the column is provided for contacting the vehicle or object and backing up the drill press as it is fed into the work during the drilling operation. This column can be made from the same material that the beam is fabricated and can be vertically mounted on a slidable sleeve which closely fits the outside of the horizontal support beam. Thus, the center support column can be moved longitudinally along the beam as necessary to span the width of the object that is being drilled. The vertically slidable collar is provided on the center support column and also includes a rack and pinion gear for vertically positioning the center support to the necessary height for the drilling operation. When desired, a pivoting support coupling at the base of the center or drill column can be provided to allow the column to be lowered into a position which is resting on or near the support beam for moving the beam and support column under an object having low clearance so that the column can be raised into proper operating position on the opposite side.

In another embodiment of the invention, an I-beam is utilized for the base beam support structure with both of the drill and center support columns having a flat base which can be clamped to the upper flange of the I-beam. In this way, it is a simple matter to longitudinally adjust the position of the center support column with respect to the drill motor for the drilling operation. In addition, both of the support columns by releasing the clamps can be completely removed from the base beam to allow the drill press to be easily slipped or maneuvered around or under a vehicle or object which is to be drilled.

The horizontal drill press described herein because of its portable capabilities is an extremely valuable piece of equipment for drilling any large or irregular pieces of equipment or objects that are too quick to be easily drilled by hand or too large to be held in a drill press or milling machine. A large variety of drill motors which can be either electric or pneumatic powered, can be easily adapted for mounting on the drill platform.

In another embodiment of the present invention the vertical columns can be formed from telescoping tubing. Tubing having a polyganol or round hollow cross-section can be utilized with preference given to a polyganol configuration such as square to prevent rotation or misalignment of the sections. The drill motor platform can be mounted on the top of the telescoping column with the mounting platform arranged in a slidable fashion with a lead adjustment screw provided for horizontally moving the drill platform and drill motor during the drilling operation. If desired, one or several of the telescoping sections can be provided with a rack and pinion type adjusting means for precisely elevating the position of the drill motor. Both the drill motor support column and the center column can be arranged according to the telescoping embodiment when desired.

The horizontal drill press as described herein can be fabricated from any suitable material such as low carbon steel or aluminum. Those areas which are expected to wear, especially the gear and adjusting screw mechanisms should be manufactured from a high strength material such as steel to prevent unnecessary wear necessitating replacement. It is also possible that where the device may be utilized on electrical equipment or an environment where high voltage may be present that the base support columns and vertical columns can be fabricated from synthetic resins which are reinforced with fiberglass or other fiberous materials. This will not only provide an electrical insulating factor but also can substantially reduce the weight of the overall structure. The wheels which are utilized for the mounting of the base support can be either the swivel type caster or the "crazy wheel" or rotating disc type wheels which are commonly used on mechanics' creepers.

BRIEF DESCRIPTION OF THE DRAWINGS

Other features of this invention will appear in the following description and appended claims, reference being made to the accompanying drawings forming a part of the specification wherein like reference characters designate corresponding parts in the several views.

FIG. 1 is a perspective view of a truck vehicle and a horizontal drill press according to the present invention positioned for drilling the chassis beam of the vehicle;

FIG. 2 is a side elevational view of the horizontal drill press;

DETAILED DESCRIPTION OF THE INVENTION

Figure 3:
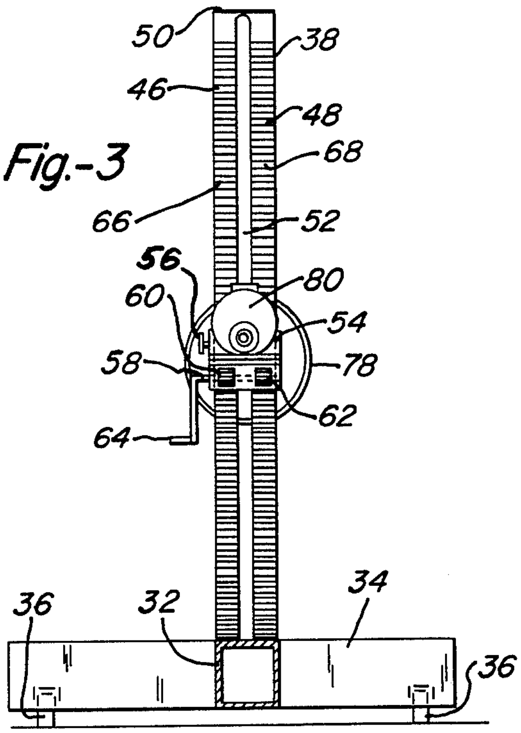
FIG. 3 is a cross sectional view taken along the lines 3—3 of FIG. 2 showing a rack and pinion elevation adjusting arrangement.
Figure 4:
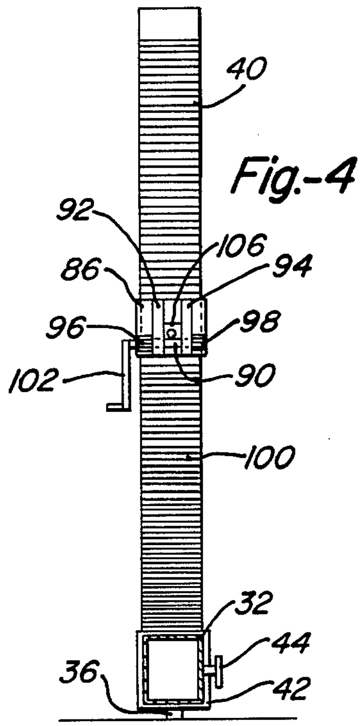
FIG. 4 is a section view taken along the lines 4—4 of FIG. 2 which shows the center support column of the present invention.

Turning now more specifically to the drawings, FIG. 1 shows a truck type highway vehicle T having cab 12, chassis beams 14, 16, cross beam 15 and wheels 18, 20 and 22. It is to be understood that throughout this description any reference to the vehicle itself is also analagous to any other type of vehicle or highway or construction equipment which requires the drilling, tapping or reaming of horizontal holes or apertures.

The long span horizontal drill press 30 according to the present invention is shown positioned under the truck T so as to straddle the chassis beams 14, 16. As can be better seen in FIG. 2, the drill press 30 includes the elongated base beam 32 and cross beam 34. The cross beam 34 is considerably shorter than the base beam 32 and is permanently joined across one end of the base beam 32 by welding. Swivel type caster wheels or "crazy wheels" 36 are mounted at the end of the base beam 32 and at each end of the cross beam 34. The wheels 36 are mounted on brackets which can be permanently attached at a location on the beams which elevates the bottom of the beams approximately one inch from the floor or support surface. The purpose in positioning the caster wheels 36 in this location is to keep the base beam 32 and cross beam 34 as close to the floor as is feasible to maintain the center of gravity of the overall device as low as possible. This is to prevent tipping of the device during movement or use.

A drill motor support column 38 is permanently mounted at the juncture of the base support beam 32 and cross beam 34. A drill center support column 40 is also provided on the base support beam 32. The column 40 is mounted on a sleeve 42 which is sized to slide easily on the beam 32. A threaded lock 44 can be used for locking the sleeve 42 in place when the column 40 has been properly positioned. With this arrangement, the end support column 40 can be moved to any position on the base support beam 32 to provide a backup support during the drilling operation.

The drill motor support column 38 can be fabricated from two, parallel, generally flat rectangular box beams 46, 48 which are welded to the cross beam 34 and are joined at their top by a flat plate 50. With this arrangement slot 52 formed between the box beams 46, 48 is provided which is arranged parallel to and aligned with the longitudinal axis of the base support beam 32.

A platform collar or sleeve 54 is sized to slidably fit over the outer surface of the column 38. A set screw or threaded lock 56 is provided on the side of the sleeve to lock the sleeve in position on the column 38 once the sleeve has been properly positioned. A height adjusting arrangement is provided on the sleeve by the use of a shaft 58 having two pinion gears 60, 62 and a crank attached at one end. The inside surface of both of the box beams 46, is provided with a rack gear having teeth which are sized to mesh with the pinion gears 60, 62. The shaft 58 is rotatably mounted on the sleeve 54 so that by turning the crank 64 the height of the drill sleeve 54 can be raised or lowered on the column 38.

A platform plate 72 and slidable mounting plate 70 is attached to the inside surface of the sleeve 54 and is keyed together to form a movable mounting platform. A gusset 74 can be provided to reinforce the platform with respect to the sleeve 54. A threaded shaft 76 having an acme thread is suitably mounted through the slot 52 with the inside end attached by a suitable swivel to the movable platform plate 70 with the other end mounted in a bearing on the sleeve 54. A hand wheel 78 is attached to the outer end of the shaft 76 so that the shaft can be easily turned. The turning of wheel 78 causes the mounting platform 70 to move laterally with respect to the column 38. A suitable drill motor 80 is mounted to the slidable platform plate 70 and is held in rigid position by suitable straps, bands or other fastening devices (not shown). In this way the adjusting screw 76 is positioned on the center line of the movable platform plate 70 and the drill motor 80. By turning the wheel 78 the drill motor 80 can be fed into or withdrawn from the work during the drilling process.

Any type of drill motor can be used with the present invention. The drill motor can be a permanently mounted type which is designed specifically for this purpose or can be a hand held portable type which can be strapped or bolted to the platform when desired. A drill chuck 82 for mounting the desired drill bits or extensions can be provided on the drill motor depending upon the actual drilling, reaming or boring which is desired.

Opposite the drill motor 80 is the center support column 40 which is mounted in a vertical position. The drill center column 40 has a drill center support 84 which is composed of a slidable sleeve 86 having a suitable threaded lock 88. It is well to mention that the threaded locks 56 and 88 which are used throughout this invention has a knob or handle at one end which can be easily hand tightened or can be of the bolt type which has a suitable head which can be tightened by a wrench.

Arranged on the inside surface of the sleeve 86 is a height adjusting device similar to the drill platform described earlier. A shaft 90 is rotatably mounted through the plates 92, 94 provided on the inside surface of the sleeve 86. Pinion gears 96, 98 are mounted on the shaft 90 and are arranged to mesh with rack gear 100 provided on the inside face of the end support column 40. A crank 102 is attached to the end of the shaft 90 so that by turning the crank 102 the height of the drill center 84 can be adjusted. A rod 104 which acts as a back-up centering or aligning device is positioned in an aperture provided in the block 106 which is mounted between the angled plates 92, 94. The aperture in the block 106 is aligned parallel with the longitudinal axis of the base support beam 32 and lies in a vertical plane through this axis. By the same token the rotating drill shaft of the drill motor 80 is also aligned in the same vertical plane through the longitudinal axis of the support beam 32. In this way the drill center rod 104 can be aligned precisely with the drill bit 83 of the drill motor 80. By adjusting the height of the drill center 104 with the drill bit 83 and positioning this with respect to the location of the hole which is to be drilled or bored, line boring of holes in hinge plates or on opposite sides of a truck chassis can be easily accomplished.

Another embodiment of the end support column as described previously can also be provided. Where it is desired to move the end column 110 under a low lying object such as the chassis beams of a truck, it is desirable to be able to lower the center column to be able to slide it under the vehicle. In order to do this the center support column 110 having a drill center sleeve device 102 and drill center 104 mounted thereon is provided. This portion is identical to the previous arrangement which has been described. The base of the column 110, however, is mounted for pivotal movement to lower the column into a storage position for lower height clearance. The support column 110 is mounted at its bottom end on a sleeve 116 which is provided for slidable movement on the base support beam 32. A hollow base socket 118 is mounted on the upper surface of the sleeve 116 and includes vertical slots 120, 122 provided on each side of the socket 118. The upper half of the inside and outside surfaces of the socket 118 are cut away to form openings 124, 126. A pin 128 is provided through the middle of the lower portion of the column 110 so that the ends protrude beyond the sides of the column 110 and engage the slots 120, 122.

For pivoting or lowering the column 110 to a position parallel to the base support beam 32 it is merely necessary to raise the column 110 a short distance so that the end 130 clears the bottom edge of the cutaways 124 or 126. When this is accomplished then the column 110 can be pivoted in either direction so that it will lie parallel to the beam 32. If necessary, a bar or stop can be provided across either of the upper edge of the cutaway 124 or 126 depending upon which direction the column is to be pivoted to provide a rigid stop so that the column 110 can be supported in horizontal position.

Throughout this embodiment, a box beam having a dimension of five inches on each side has been found to be satisfactory for light to medium work requirements. This is to say that the base support beam 32, cross beam 34, and columns 38 and 40 can be fabricated from a five inch box beam. Since these beams are hollow, the entire device can be relatively light weight. The sleeves 42, 54 and 86 are sized to closely fit the outside dimensions of the beams that are used as the support structure. The inside dimensions of the socket 118 is sized to closely fit the outside dimensions of the column 110 so that when the column is in the vertical position it will slide into the base and will fit snugly into the socket 118 to provide a rigid support.

Figure 6:
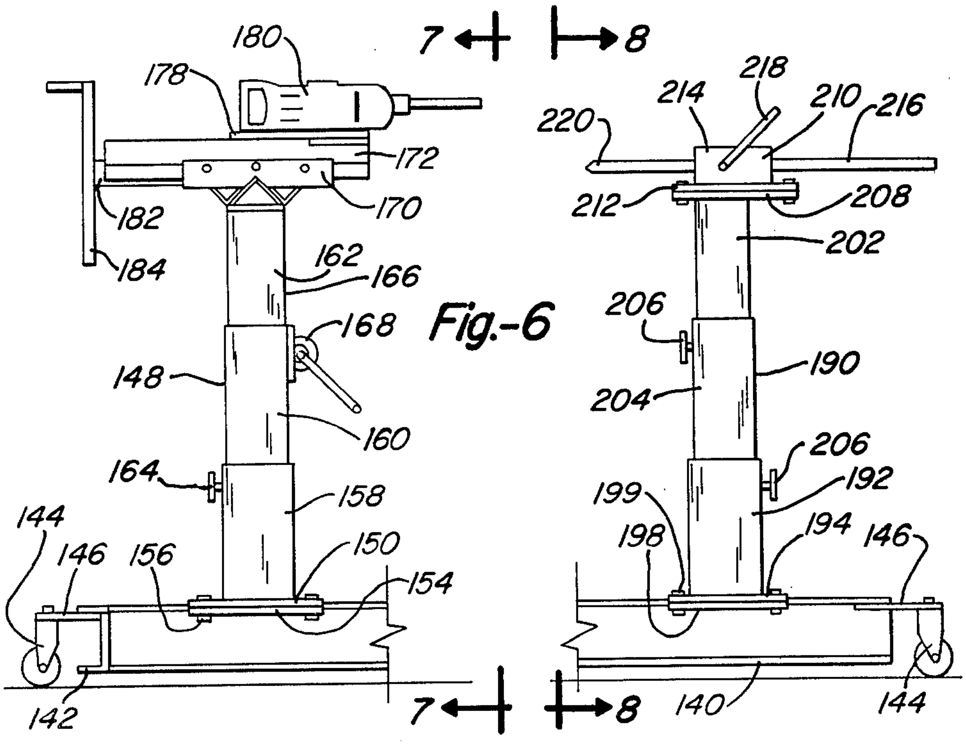
FIG. 6 is an enlarged side elevational view of another embodiment of the invention showing an I-beam base support and telescoping vertical columns.
Figure 7:
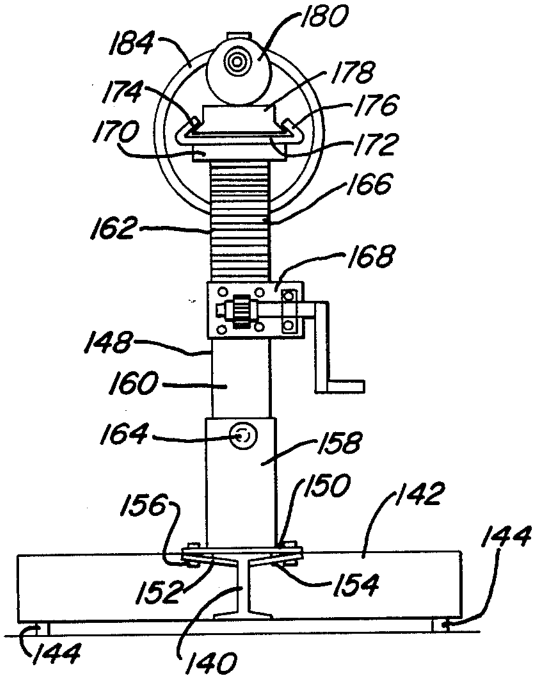
FIG. 7 is a partial sectional view taken along lines 7—7 of FIG. 6 showing the drill platform mounted on the top of the vertically adjustable telescoping column.
Figure 8:
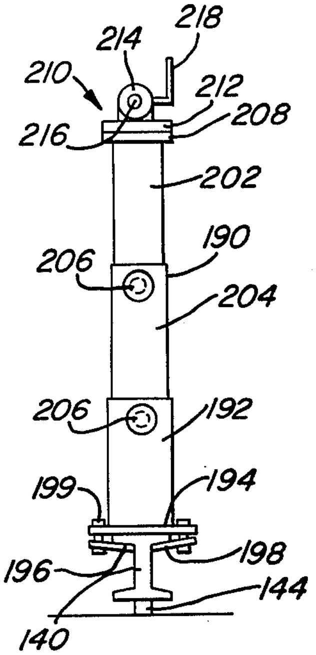
FIG. 8 is a partial cross sectional view taken along lines 8—8 of FIG. 6 showing the center support telescoping column.
Figure 5:
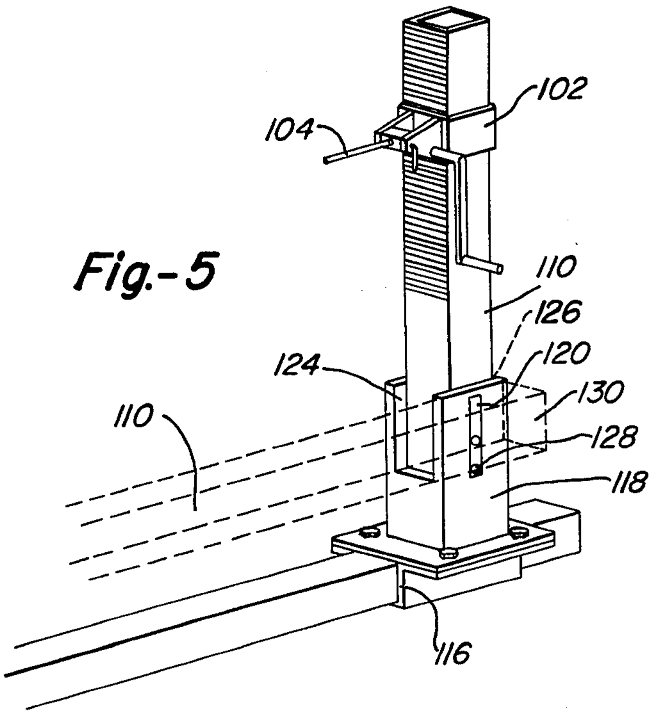
FIG. 5 is a perspective view of a pivoting base arrangement for the center support column.

FIG. 6 shows another embodiment of the horizontal drill press according to the present invention which illustrates the horizontal base beam 140 and cross beam 142 joined in a similar manner as described above but fabricated from I-beams to form an open web flanged construction. Swivel type caster wheels 144 are attached to the support beams by brackets 146. The drill support column 148 is attached to the upper surface of the base support beam by a plate 150 which is clamped to the underside of the top flange by a pair of flange plates 152, 154 and bolts 156. Telescoping column sections 158, 160 and 162 are arranged to interfit a sufficient distance and allow adjustable height for the drill motor. The middle section 160 closely fits within the base section 158. A set screw or threaded lock 164 is provided to hold the middle section in adjusted position. Gear teeth in the form of a rack 166 is provided on the inside surface of the upper section 162 which meshes with a pinion gear crank assembly 168 which is mounted on the inside surface of the middle section 160. The pinion gear assembly 168 and the rack gear 166 form a height adjusting device for positioning the upper section 162 to variably adjust the height of the drill motor. A saddle 170 is mounted at the top of the upper section 162 and includes a flat platform support section 172 which has upwardly turned sides 174, 176 which form a channel in which a slidable base 178 is positioned. A drill motor 180 is suitably mounted on the slidable base 178. A threaded shaft 182 having a hand wheel 184 attached to one end is connected at the other end to the slidable base plate 178. A suitable drill chuck and drill bit can be provided for the drill motor 180 in a similar manner as previously described.

A telescoping center support column 190 can also be mounted on the base support beam 140. In a manner which is similar to that described for the drill support column 148 the center column 190 is formed from a plurality of telescoping sections. The base section 192 is mounted on the base plate 194 which is clamped to the upper flange of the support beam 140 by means of the side clamp plates 196, 198 and the bolts 199. With this type of clamp arrangement the support column can be manually moved to any position along the support beam by merely loosening the bolts 199 and sliding the column along the beam. It is also possible to either completely remove the column from the beam by removing the bolts 199 or by loosening the bolts 199 the column can be easily slipped from the end of the beam flange. The upper section 202, midsection 204 and the base section 192 of the support column 190 are sized to slidably fit together in a telescoping fashion. Set screws or locks 206 which can be hand tightened or loosened are provided to hold the telescoping sections in proper position once the height of the center has been established.

At the top of the uppermost section 202 is mounted a base plate 208 which is used for support of the backup center device 210. The center device 210 utilizes a support plate 212 and a mounting block 214. A center rod 216 is positioned in an aperture through the block 214 and is clamped in position by the threaded set screw 218. In this way, the projection of the center rod 216 beyond the support column 190 can be easily adjusted when desired.

The purpose of the backup drill center is for providing a horizontal support for the drill press during operation. In other words, the end 220 of the rod 216 is adjusted to contact a rigid support surface on the vehicle or object which is usually opposite the hole being drilled. In this way, the drilling device can be supported longitudinally so that the drill motor and drill can be smoothly fed into the work piece. This makes the drilling operation a one man process even though the object being drilled may be quite large and have a considerable span. In addition, by aligning the drill center rod and the drill motor so that they are on precisely the same axis it is a simple matter to insert the drill center into a bushing positioned in one-half of a hinge pivot for a bucket or a loader while the opposite hinge bushing is being precisely line bored or reamed.

OPERATION

In operation, the long span horizontal drill press as defined in the present invention is easily maneuvered on the support surface. If the object which is to be drilled has low clearance with the support floor, it may be necessary to pivot the drill support column or remove it in order to slide the drill base beam under the vehicle or object to properly position it. Once it has been positioned the drill center column is then longitudinally adjusted with respect to the drill motor. After a proper sized drill bit is installed in the drill chuck the drill motor platform is retracted to a position against the support column. The drill center at the opposite end of the support beam is positioned and moved along the beam until the center is in contact with the object. Once in this position it is clamped onto the beam to secure it. The height of the drill center is then adjusted so that the tip of the center is still in contact with the surface of the vehicle or object being drilled and essentially opposite the location for the drilled hole. Once the drill center is properly positioned and in contact with the object the drill motor is started and the drill bit is fed into the work at the proper speed. In this way, the precisely aligned aperture or bore can be formed both quickly and easily without the operator having to physically support the weight of the drill motor and apply additional longitudinal force to the drill motor during the drilling operation. As can be seen, the horizontal drill press as described herein can be easily positioned and utilized to drill any number of holes in quick succession.

It is to be understood that the position of the drill and center columns on the support beam can be reversed if desired. It is also possible to provide a swivel device on the drill motor platform to allow the drill motor to be angled up or down with respect to the horizontal plane in order to be able to drill holes at various angles. All of these alternatives are intended to be considered part of this invention.

While an improved horizontal drill press has been shown and described in detail in this application, it is to be understood that this invention is not to be considered to be limited to the exact form disclosed and changes in the detail and construction of the invention may be made without departing from the spirit thereof.

What is claimed is:

1. A long reach horizontal drill press for drilling, tapping and reaming large holes in the surfaces of vehicles or equipment, the horizontal drill press comprising:

(a) a base support structure means mounted on a moving means whereby the structure means can be easily moved and positioned over a generally flat support surface, said support structure means includes a longitudinally extending beam having a cross beam transversely attached at one end and said moving means is attached to the free ends of the beams and arranged to provide minimum clearance between the support surface and the structure means whereby the support structure means is relatively stable to prevent tipping;

(b) a drill support column means mounted at one end of said structure means, said column means having a platform means slidably mounted on said column means, said platform means having means for mounting a drill motor for drilling large diameter holes in said vehicle or equipment, said drill support column means having means for adjusting the height of said platform means above said support structure means whereby the drill motor and drill bit mounted therein can be properly positioned for the drilling operation;

(c) a drill center column means mounted on said base support structure means and arranged to be longitudinally adjusted on said structure means with respect to said drill support column means, said center column means having a drill center support means with adjusting means mounted on said column means whereby the height of the drill center can be adjusted to properly position the drill center opposite the drill motor with respect to the work on which the drilling operation is to be performed; and (d) means pivotably mounting at least one of said column means with respect to said base support structure means whereby the column can be moved from a first rigid upright position to a lowered second position where the column is arranged adjacent to said base support structure means so that the drill press can easily move under and into position on an object having a low clearance.

2. A horizontal drill press as defined in claim 1 wherein said elongated support beam is a hollow box beam.

3. A horizontal drill press as defined in claim 1 wherein said elongated base support beam is an I-beam having upper and lower flanges.

4. A horizontal drill press as defined in claim 1 wherein said moving means is a plurality of swivel type caster wheels mounted on said support structure means whereby the structure means can be easily moved and positioned on said support surface.

5. A horizontal drill press as defined in claim 1 wherein at least one of said drill support or center column means is removable from said base support structure means.

6. A horizontal drill press as defined in claim 1 wherein said drill support column means is a one-piece member and the means for height adjusting the drill motor platform means includes a rack and pinion gear assembly.

7. A horizontal drill press as defined in claim 1 wherein at least one of the drill support or center column means is fabricated from a plurality of sections which are sized to interfit and slidably telescope within each other, said sections include locking means whereby said drill motor platform or center support means can be easily adjusted in height and locked in position.

8. A horizontal drill press as defined in claim 1 wherein said drill support column means is a single support member mounted on a slidable sleeve which is positioned on said base support structure means so that the center column means can be slidably moved longitudinally on said structure means with respect to said drill support column means, said center height adjusting means includes a plurality of rack gear teeth formed on one surface of said column and arranged to mesh with a pinion gear means mounted on said slidable sleeve whereby the height of said drill center means can be easily and quickly adjusted.

9. A long reach horizontal drill press for drilling and reaming large holes in the surfaces of vehicles and equipment, the horizontal drill press comprising:

(a) a base support structure means having a longitudinally extending base support beam and a cross beam attached at its midpoint to the base support beam, said beams having a swivel type caster wheels attached their ends whereby the base support structure means can be easily moved across a support surface without tipping;

(b) a drill support column means mounted on said base support beams near the juncture of said cross beam and having a platform means slidably mounted on said drill support column, said platform means having means for the mounting of a drill motor to be positioned parallel to the longitudinal axis of the said base support beam, means to adjust the position of said platform whereby the height of said drill motor platform means can be easily and quickly adjusted whereby the drill motor can be easily positioned for the drilling operation;

(c) a center column means provided on said base support beam and arranged to compliment the drill support column means, said center support column means being vertically mounted on a support means which is slidably mounted on said base support beam whereby said center column means can be adjustably positioned to vary the distance between said drill support and center support column means, a drill center support means slidably mounted on said column means whereby the height of said drill center can be easily adjusted, means pivotably mounting said center column means on said support means so that it can be lowered into a position adjacent to said support beam to allow the beam to pass under objects having a low clearance; and (d) said drill support platform includes a means for variably positioning the drill support platform along a longitudinal direction corresponding to said base support beam whereby the drill support platform can be moved so as to feed the drill motor into the work during the drilling process.

10. A horizontal drill press as defined in claim 9 wherein both the drill support and center column means are each fabricated from one-piece members and the height adjusting means is a rack and pinion gear assembly.

11. A horizontal drill press as defined in claim 9 wherein both the drill support and center column means are each fabricated from two or more column sections which are arranged to telescope and lock to allow height adjustment for the drill platform and drill center means.

* * * * *